UNITED STATES PATENT OFFICE.

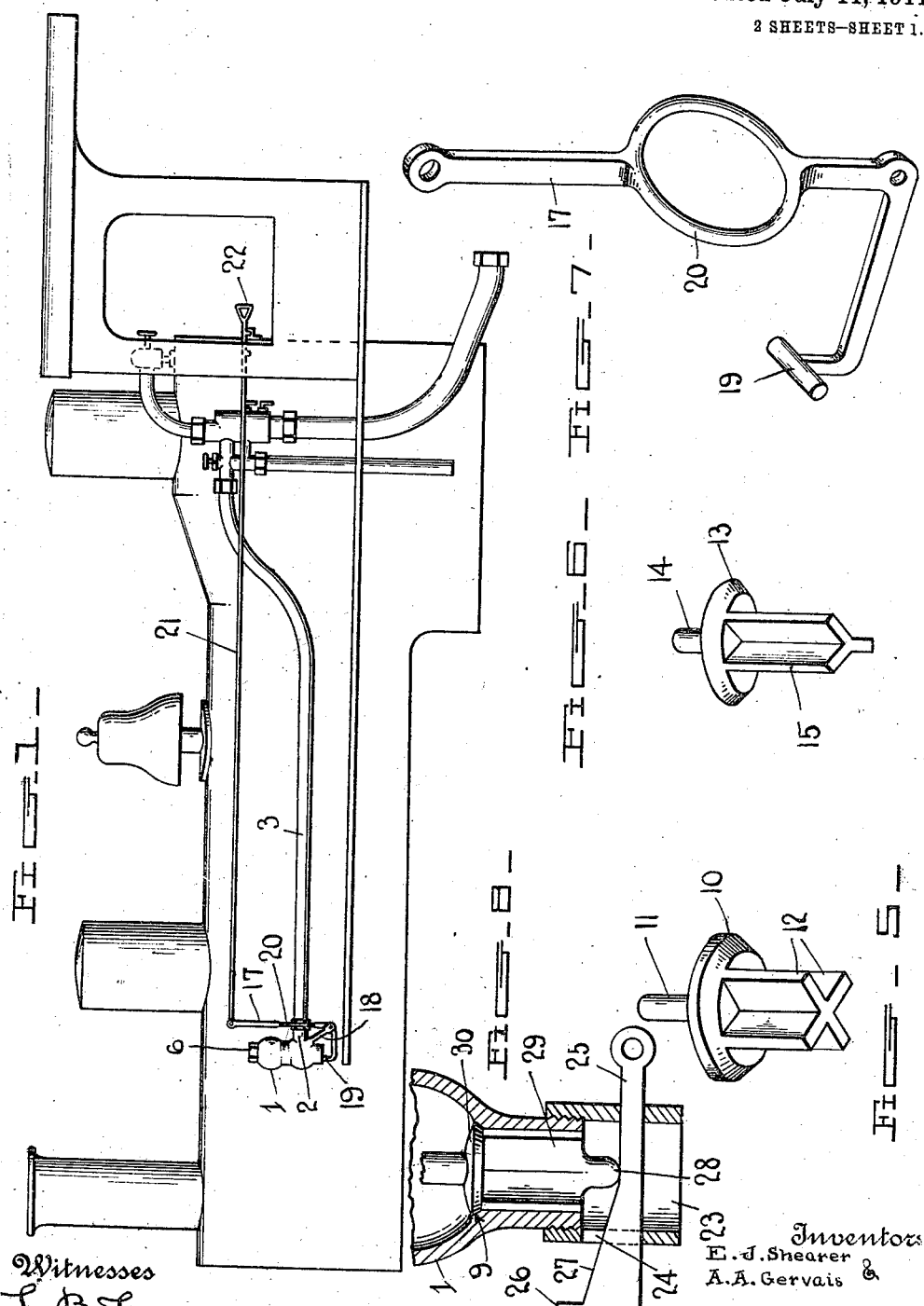

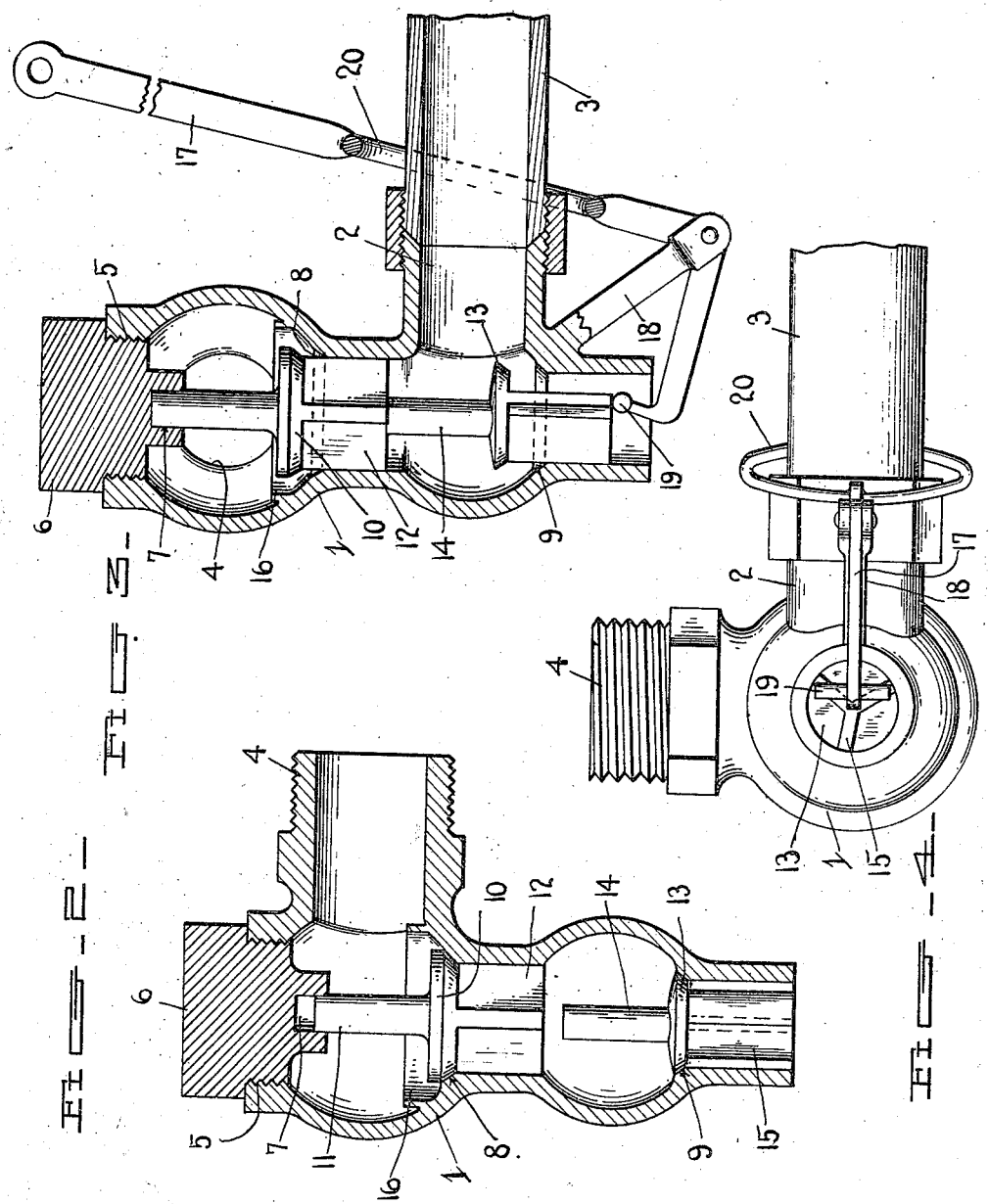

EDWARD J. SHEARER AND ARTHUR A. GERVAIS, OF LORDSBURG, TERRITORY OF NEW MEXICO.

CHECK-VALVE FOR BOILERS.

997,862.    Specification of Letters Patent.    Patented July 11, 1911.

Application filed November 17, 1910. Serial No. 592,882.

*To all whom it may concern:*

Be it known that we, EDWARD J. SHEARER and ARTHUR A. GERVAIS, citizens of the United States, residing at Lordsburg, in the county of Grant and Territory of New Mexico, have invented certain new and useful Improvements in Check-Valves for Boilers; and we do declare the following to be a full, clear, and exact description of the invention, such as will enable others skilled in the art to which it appertains to make and use the same.

This invention relates to improvements in check valves for boilers.

One object of the invention is to provide a check valve for boilers having an improved mechanism for releasing the same when stuck and means whereby any obstructions which might interfere with the proper seating of the valve may be blown out.

Another object is to provide means whereby the valve releasing mechanism may be operated from the cab of a locomotive without danger of the operator being scalded.

With these and other objects in view, the invention consists of certain novel features of construction, combination and arrangement of parts as will be more fully described and particularly pointed out in the appended claims.

In the accompanying drawings; Figure 1 is a side view of a portion of a locomotive showing the arrangement and application of the invention thereto; Fig. 2 is an enlarged vertical sectional view through the casing of the improved valve showing the parts in closed position; Fig. 3 is a similar view taken at right angles to Fig. 2 showing the parts in open position; Fig. 4 is a bottom plan view of the valve casing and the valve operating mechanism; Fig. 5 is a detail perspective view of the check valve; Fig. 6 is a similar view of the releasing valve for the check valve; Fig. 7 is a detail perspective view of the operating lever for the releasing valve: and, Fig. 8 is a vertical sectional view of a portion of a valve casing showing a modified construction of operating mechanism for the releasing valve.

Referring more particularly to the drawings, 1 denotes the casing of the check and releasing valves on the lower portion of which is formed a connection 2 for the injector tube 3, while on the upper portion is formed a connection 4 for the boiler pipe. In the upper end of the casing is formed a threaded opening 5 through which the valves are engaged with their seats in the valve casing. The opening 5 is closed by a plug 6 having in its inner end a guide and socket 7. In the upper portion of the casing between the connections 2 and 4 is formed a check valve 8, while in the lower portion of the casing below the connection 2 is formed a valve seat 9.

Adapted to be engaged with the valve seat 8 is a check valve 10 which may be of the usual or any approved construction and which is provided on its upper side with a guide stem 11, the upper end of which slidably engages the socket 7 in the lower end of the plug 6. On the lower side of the valve 10 is formed a series of guide lugs or wings 12 which slidably engage the inner walls of the adjacent portion of the casing as shown. Adapted to be engaged with the lower valve seat 9 is a releasing valve 13 having on its upper side a stem 14 and on its lower side a series of guide wings or lugs 15 which slidably engage the inner surface of the lower end of the casing as shown. By thus constructing and arranging the valves 10 and 13 it will be seen that when the lower or releasing valve 15 is raised that the stem 14 thereof will be brought into engagement with the lower end of the wings 12 of the upper valve thus releasing and raising said valve should the latter become stuck and fail to open under pressure of the water from the injector. In the upper portion of the valve casing around the valve 10 is formed an annular flange 16 which is provided to prevent the pressure from the boiler from coming into direct contact with the ground seat of the valve, as such direct pressure striking the side of the valve might possibly cause the same to leak.

In order to actuate the releasing valve we provide a suitable operating mechanism which is here shown and preferably comprises a bell crank or right angular lever 17 which is pivotally connected at its lower end to a bracket arm 18 formed on the lower portion of the casing 1. The lower or horizontal arm of the lever 17 is provided on its outer end with a transversely disposed head 19 which is adapted to engage the lower ends of the lugs or wings 15 of the releasing valve. In the upright or vertical arm of the lever 17 is formed an opening 20 through which the injector pipe extends thus permitting the lever 17 to be pivoted in line with the center of the valve casing and injector pipe. To the upper end of the lever 17 is connected an operating rod 21 which extends back into the cab of the locomotive and is provided with a handle 22 whereby the same is operated, and with a suitable locking mechanism for holding the same and the lever 17 in their adjusted position. By thus arranging the lever 17 the same when operated will lift the releasing valve 15 upwardly to the position shown in Fig. 3 of the drawing whereupon the stem 14 will be engaged with the wings 12 of the valve 10 thereby raising said valve upwardly or forcing the same out of engagement with its seat when for any reason the valve has become stuck and fails to open under the pressure of the water from the injector. The valve 13 when thus opened will also permit any dirt or foreign matter which may have accumulated on the seat of the check valve 10 and which might interfere with the closing of said valve, to be blown out through the lower open end of the valve casing.

In Fig. 8 of the drawings is shown a modified construction and arrangement of the operating lever for the releasing valve. In this figure the valve casing has screwed onto the lower end thereof a short section of pipe 23 in which is formed oppositely disposed passages 24. With the passages 24 is slidably engaged a valve lifting lever or bar 25 having on one end a stop lug 26 and on its upper edge adjacent to this end an inclined or cam surface 27 which is adapted to be drawn into engagement with an operating lug 28 formed on the lower end of the wings 29 of the releasing valve 30 shown in this figure whereby when the bar or lever is drawn through the passages 24 the releasing valve will be lifted from its seat and brought into engagement with the check valve thereby forcing the latter to an open position as hereinbefore described. The bar or lever 25 is provided on one end with an eye with which is adapted to be connected an operating rod (not shown.)

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention what we claim is:

1. A check valve comprising a casing having upper and lower communicating chambers connected by a contracted neck portion, an annular flange formed integral with the upper chamber and above said neck portion, a plug adjustably attached to the casing for closing the upper end of the same, a check valve seated within the open flanged portion of the upper chamber and provided with wings slidably located in the contracted neck portion of the casing, whereby the valve is vertically guided and held in operative position, a releasing valve seated in the lower chamber of the casing and having a projecting stem for engagement with the upper valve, and means for elevating the releasing valve, whereby the check valve is likewise elevated.

2. A combined boiler feed and blow off comprising alined chambers joined by a cylindrical neck, each chamber having a valve seat, one of said valve seats located at the end of the cylindrical neck, valves on said seats, each chamber having an opening beyond the head of the valve therein when the valve is seated, one valve adapted to move the other and means to operate the motor valve.

In testimony whereof we have hereunto set our hands in presence of two subscribing witnesses.

EDWARD J. SHEARER.
ARTHUR A. GERVAIS.

Witnesses:
FRANK R. COON,
JOSEPH C. CRANE.